United States Patent [19]

Schadt et al.

[11] Patent Number: 5,500,752
[45] Date of Patent: Mar. 19, 1996

[54] METHOD FOR GIVING CHOLESTERIC LIQUID CRYSTALS A PLANAR ORIENTATION FREE FROM FAULTY INCLINATION

[75] Inventors: Martin Schadt, Seltisberg, Switzerland; Hubert Seiberle, Rümmingen, Germany

[73] Assignee: Hoffmann-La Roche Inc., Nutley, N.J.

[21] Appl. No.: 373,875

[22] Filed: Jan. 17, 1995

Related U.S. Application Data

[63] Continuation of Ser. No. 223,121, Apr. 5, 1994, abandoned, which is a continuation of Ser. No. 14,897, Feb. 8, 1993, abandoned.

[30] Foreign Application Priority Data

Feb. 21, 1992 [CH] Switzerland .................. 536/92

[51] Int. Cl.⁶ .................. G02F 1/1337; G02F 1/13
[52] U.S. Cl. .................. 359/76; 359/78; 359/101
[58] Field of Search .................. 359/76, 78, 101

[56] References Cited

U.S. PATENT DOCUMENTS 4,140,371 2/1979 Kanazaki et al. .................. 359/89
4,239,345 12/1980 Berreman et al. .................. 359/101
5,061,047 10/1991 Bradshaw et al. .................. 359/101

FOREIGN PATENT DOCUMENTS 0036678 9/1981 European Pat. Off. .

OTHER PUBLICATIONS

Miike et al., Jap. J. Appl. Phys., vol. 19, No. 4, Apr. 1980, pp. 653–658.
De Zwart et al., Physics Letters, vol. 55A, No. 1, Nov. 1975, pp. 41–42.
Schadt et al., Japanese Journal of Applied Physics, vol. 29, No. 10, Oct. 1990, pp. 1974–1984.
Nagappa et al., Mol. Cryst. Liq. Cryst., vol. 101, 1983, pp. 103–127.

*Primary Examiner*—William L. Sikes
*Assistant Examiner*—Ron Trice
*Attorney, Agent, or Firm*—George M. Gould; George W. Johnston

[57] ABSTRACT

A liquid crystal cell comprising a cholesteric liquid crystal (3) between parallel plates (1, 2) as used e.g. for optical filters. The previously unavoidable interference through faulty disinclination is eliminated in that the cholesteric liquid crystal is mixed with a nematic or smectic liquid crystal material having negative dielectric anisotropy and the cell is subjected to an electric field directed at right angles to the plates.

8 Claims, 1 Drawing Sheet

METHOD FOR GIVING CHOLESTERIC LIQUID CRYSTALS A PLANAR ORIENTATION FREE FROM FAULTY INCLINATION

This is a continuation of U.S. application Ser. No. 08/223,121, filed Apr. 5, 1994, now abandoned which is a continuation of U.S. application Ser. No. 08/014,897, filed Feb. 8, 1993, now abandoned.

BACKGROUND OF THE INVENTION

1. Field of the Invention

The invention relates to a method of planar orienting of cholesteric liquid crystals free from faulty inclination between the two parallel plates of a liquid crystal cell. The invention also relates to means for working the method.

2. Description

In the case of cholesteric liquid crystals used in optical components, particularly in optical filters, a liquid crystal layer has to be given a uniform planar orientation between the two parallel plates of a liquid crystal cell. "Planar" as used in this description means either molecule arrangements parallel to the plate or arrangements in which the molecules have a so-called tilt angle of up to 30° C.

During manufacture of these cells, focal-conical faulty inclination lines occur, e.g. as a result of flow orientation or cooling of the liquid crystal from the isotropic phase. As a result of these faulty inclination lines, incident light is scattered. The scattered light is also depolarized and thus reduces the filtering or polarizing efficiency of cholesteric liquid crystal filters (compare Jpn. J. Appl. Phys., Vol. 29, No. 10, 1990, pages 1974–1984, particularly page 1975).

The appearance can be improved by cutting the glass plates, but this method does not completely eliminate the faulty inclination lines and is also impracticable on a production scale.

SUMMARY OF THE INVENTION

The aim of the invention is to avoid these interfering faulty inclinations in cholesteric liquid crystal cells.

According to the invention, the cholesteric liquid crystal is mixed with a nematic or smectic liquid crystal material having negative dielectric anisotropy and the cell is subjected to an electric field directed at right angles to the plates.

The method according to the invention is surprisingly successful in giving a planar orientation over a large area to a cholesteric liquid cell mixture having a small pitch, the planar orientation being so uniform that not a single faulty disinclination line occurs over the entire oriented region.

It has also been found that this is possible even if only one or neither of the two cell substrates has a wall orientation aligning the liquid crystal molecule in a preferred direction. This is particularly surprising because these orientation layers have hitherto been considered essential.

DETAILED DESCRIPTION OF THE INVENTION

An embodiment of the invention will now be described with reference to the accompanying drawing.

BRIEF DESCRIPTION OF THE DRAWING

The single drawing is a diagram in section of a cholesteric liquid crystal filter/polarizer cell. These cells are known e.g. from the previously-mentioned article. In the present embodiment the cell comprises a cholesteric liquid crystal 3 between 2 plane parallel glass plates 1, 2 and having a pitch p. The glass plates, on their surfaces facing the liquid crystal, have ITO coatings 4, 5 which are known in liquid crystal displays. These ITO coatings however are not segmented here in the usual manner. The distance between the glass plates, which is not critical, is adjusted by spacers to about 8 μm.

The ITO-coated glass plates 1,2 used for the cell can have a special orienting layer 6, 7 which aligns the liquid crystal molecule in a preferred direction parallel to the plate surface or at a given angle of inclination thereto.

PREFERRED EMBODIMENT

Figure 1:
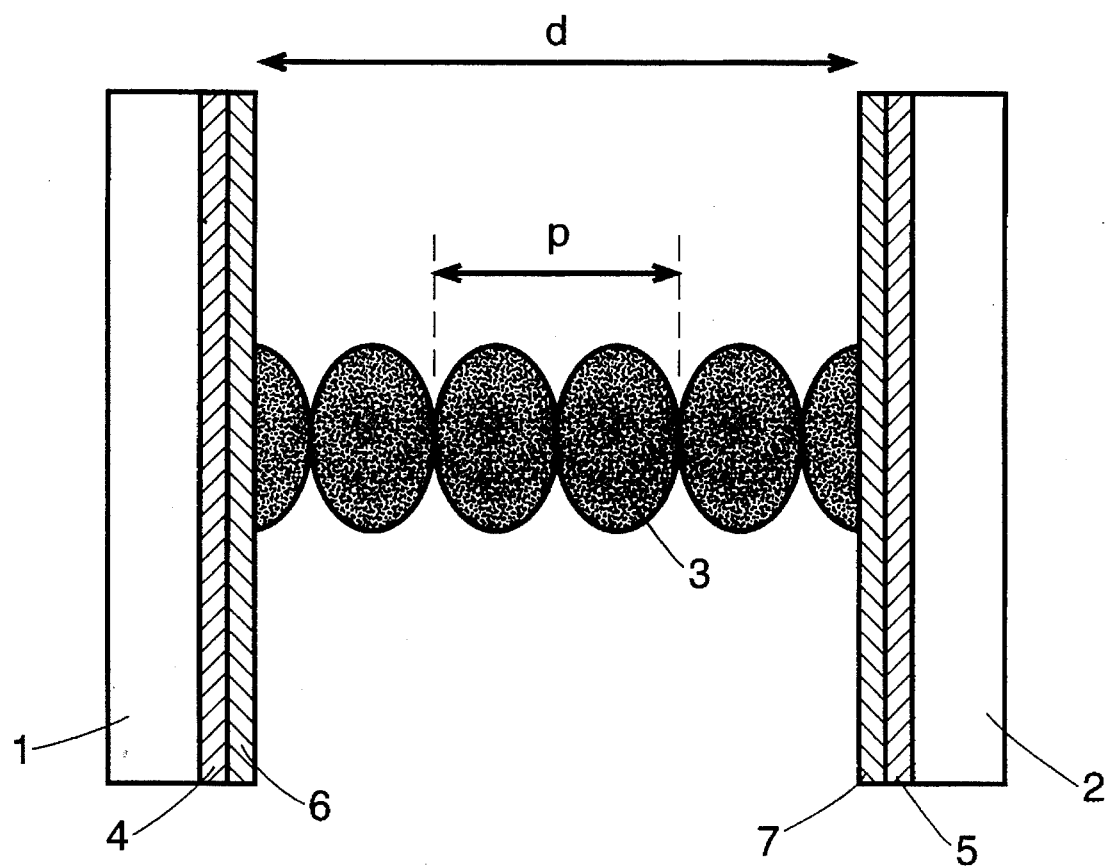

The crystal 3 shown in FIG. 1 consists of a mixture of three cholesteric compounds and a nematic "host" having negative dielectric anisotropy.

Preferably, the three cholesteric compounds and their proportions by weight in the mixture are:

| Structure | Proportion by weight [%] |
|---|---|
| $C_{10}H_{21}$—[dioxolane]—[phenyl]—COO—$C_6H_{13}$ | 7.5 |
| $C_8H_{17}$—[dioxolane]—[phenyl]—[dioxolane]—$C_8H_{17}$ | 8.0 |

| Structure | Proportion by weight [%] |
|---|---|
| C₈H₁₇···⟨O-CH-O⟩-CH-⌬-⌬-COO-CH(C₆H₁₃)[R] | 6.5 |

The nematic mixture is made up as follows:

| Structure | Proportion by weight [%] |
|---|---|
| (cyclohexyl-cyclohexyl with alkyl chains) | 4.1 |
| (cyclohexyl-cyclohexyl with alkyl chains) | 6.7 |
| (cyclohexyl-cyclohexyl with alkoxy) | 2.6 |
| (cyclohexyl-cyclohexyl with alkoxy) | 7.7 |
| (cyclohexyl-phenyl with alkoxy) | 1.5 |
| (cyclohexyl-phenyl with alkoxy) | 3.6 |
| (cyclohexyl-CH₂-phenyl with alkoxy) | 7.2 |
| (cyclohexyl-phenyl with alkyl) | 3.6 |
| (cyclohexyl-cyclohexyl-phenyl) | 4.1 |
| (cyclohexyl-cyclohexyl-phenyl) | 6.7 |
| (cyclohexyl-phenyl-CH₂-cyclohexyl) | 3.6 |
| (cyclohexyl-cyclohexyl-CN) | 5.5 |
| (cyclohexyl-cyclohexyl-CN) | 3.9 |
| (cyclohexyl-cyclohexyl-O-phenyl(F,F)-O-alkyl) | 9.4 |
| (alkyl-phenyl(F,F)-phenyl-C≡C) | 7.8 |

This liquid crystal mixture has a negative dielectric anisotropy of $\epsilon = -1.6$ and a helical pitch of $p = 0.35$ nm at 22° C.

In order to eliminate the faulty disinclination lines which remain after filling the cell, in spite of surface orientation, an AC voltage of 20–60 V is applied to the cell for about 1 minute. A uniform planar orientation is produced, free from faulty inclination. This orientation remains even after the current has been switched off, and is permanently stable.

Instead of providing an ITO coating on the plates and applying a voltage to them, the cells can be brought into or moved through an electric field generated for the required time outside the cell, e.g. in the form of a corona discharge.

It has been found that removal of faulty inclination in this way is equally efficient if only one or neither glass plate has the two wall orientation layers. In other words, pre-orientation to eliminate wall influences is not essential. This has the important advantage that orientation layers do not have-to be applied when producing the aforementioned filter/polarizer cells.

In addition to the application in the aforementioned embodiment, the invention has other applications. More particularly the invention is not restricted to cells in which the liquid crystal is disposed between glass plates. Cells can be manufactured in the same manner with plastics plates or even in the form of chiral polymer foils free from faulty inclination.

As is known, compensation layers are used in liquid crystal displays comprising highly twisted nematic liquid crystals ("supertwist" LCDs), to avoid undesired discoloration when switched off. Normally the compensation layer is an additional highly-twisted TN layer, which requires a third boundary wall with suitable orientation layers but without electrode coating. This method, which is very complicated as regards manufacture, can be replaced by planar-oriented chiral liquid crystal polymer sheets, which are produced according to the invention and stuck to the actual display cell.

What is claimed is:

1. A method of planar orienting cholesteric liquid crystals to produce cholesteric liquid crystals free from faulty inclination lines between two parallel plates comprising the steps of:

mixing a cholesteric liquid crystal material with a nematic or smectic liquid crystal material having negative dielectric anisotropy, filling the parallel plates with the mixed liquid crystal materials to form a liquid crystal cell having at least one faulty inclination line, subjecting the liquid crystal cell to an electric field at right angles to the plates to produce planar orientation of the cholesteric liquid crystals which is free from faulty inclination lines, and removing the electric field, wherein the liquid crystal cell remains free of faulty inclination lines after the electric field is removed.

2. A method according to claim 1, characterized in that at least one of the plates does not have a coating for orienting the liquid crystal materials in a preferred direction.

3. A method according to claim 1, characterized in that the plates are given electrode coatings to which a voltage is applied to generate the electric field.

4. A method according to claim 1, wherein said cell is brought into or moved through an electric field generated outside the cell.

5. A method according to claim 4, wherein said electric field is generated in the form of a corona discharge.

6. A method according to claim 1, wherein a voltage of from 20 V to 60 V is applied to the cell.

7. A method according to claim 1, wherein said orientation is permanently stable.

8. A method according to claim 1, wherein said cholesteric liquid crystal material is a mixture of cholesteric liquid crystal compounds.

* * * * *